United States Patent Office 3,085,054
Patented Apr. 9, 1963

3,085,054
RECOVERY OF NICKEL
Philip G. Thornhill, Richmond Hill, Ontario, Canada, assignor to Falconbridge Nickel Mines Limited, Toronto, Ontario, Canada, a corporation of Canada
Filed Feb. 25, 1960, Ser. No. 11,055
10 Claims. (Cl. 204—113)

The present invention relates to the recovery of nickel and has for its object more particularly improvements in the treatment of copper-nickel matte, such as is obtained in the smelting of sulphide ores containing those and other metallic values, in the recovery of nickel and other metals.

An object of the present invention is to separate nickel from copper-nickel Bessemer matte and the like to yield on the one hand a nickel product in a highly purified form, and on the other hand a copper residue substantially free from nickel, but containing the platinum metals. More particularly, an object of the invention is to chloridize the nickel in such mattes by treatment with hydrochloric acid, and to separate therefrom solid nickel chloride in a state of extreme purity. Further objects are to reduce the nickel chloride to nickel metal, to regenerate the hydrochloric acid for treatment of further quantities of matte, and to recover as by-products other valuable constituents of the matte such as cobalt, sulphur and precious and platinum metals.

It has been proposed to leach certain copper-nickel Bessemer mattes with hydrochloric acid for the selective chloridizing of the nickel, and to recover the nickel by electrolysis of the resulting solution. Since the nickel occurs in the matte as nickel sulphide, its dissolution would be accompanied by the release of an equivalent quantity of hydrogen sulphide. This, it has been stated, could be made to react with the equivalent quantity of chlorine released in the electrolysis of the nickel chloride solution to yield sulphur and regenerated hydrochloric acid equivalent to the acid employed in the leaching step. The regenerated hydrogen chloride could then conceivably be dissolved in spent electrolyte to form the leaching reagent for fresh quantities of matte, thus completing the leach-electrolysis circuit.

Such a scheme, while theoretically attractive, would in practice be highly inefficient since the requirement of substantial neutrality of electrolyte, (a) for precipitation and separation of dissolved impurities such as iron, copper, cobalt and lead, and (b) for efficient electro-deposition of the nickel, is incompatible with the large excesses of acid necessary for practical rates of extraction of nickel from the matte. In other words, if a substantially complete separation of the nickel were to be made in a direct leaching operation, the resulting solution would contain a large proportion of unreacted acid which would require neutralization prior to electrolysis. Such neutralization would be uneconomical, not only in terms of the acid irretrievably lost, but also because of the cost of the neutralizing agent required. On the other hand, any attempt to operate the leaching ssytem in a counter-current manner, and so achieve some approach to neutrality in the leach liquor by bringing acid-depleted solution into contact with fresh matte, would meet with other serious difficulties. These are based on the circumstance that the continuously reacting mixtures of matte and acid are hot and corrosive, giving off extremely poisonous and corrosive gases which escape to their surroundings when liquid-solid separations are attempted. Thus not only would the liquid-solid separations of the counter-current system contribute serious hazards to life and property, but would also permit the escape from the circuit of some of the gas required for regeneration of the leaching acid. In any case, the refractory nature of copper-nickel matte is such that practically neutral solutions could only be obtained at the expense of relatively low nickel extractions from the matte, even in several stages of counter-current leaching.

The present invention is based on the discovery of efficient and economic methods of separating the greater part of the impurities from highly acidic nickeliferous solutions without the necessity of first neutralizing all or any part of the contained acid. The invention further takes advantage of the fact that it is possible subsequently to separate the nickel from the solution, and so to effect an even greater degree of purification of the nickel, again without recourse to neutralization of the contained acid, thus permitting recirculation of the barren acid for the dissolution of further quantities of nickel.

These and other advantages of the invention will be better understood, it is believed, by referring to the attached flow sheet, illustrative of a practice of the invention, taken in conjunction with the following description:

Figure 1:
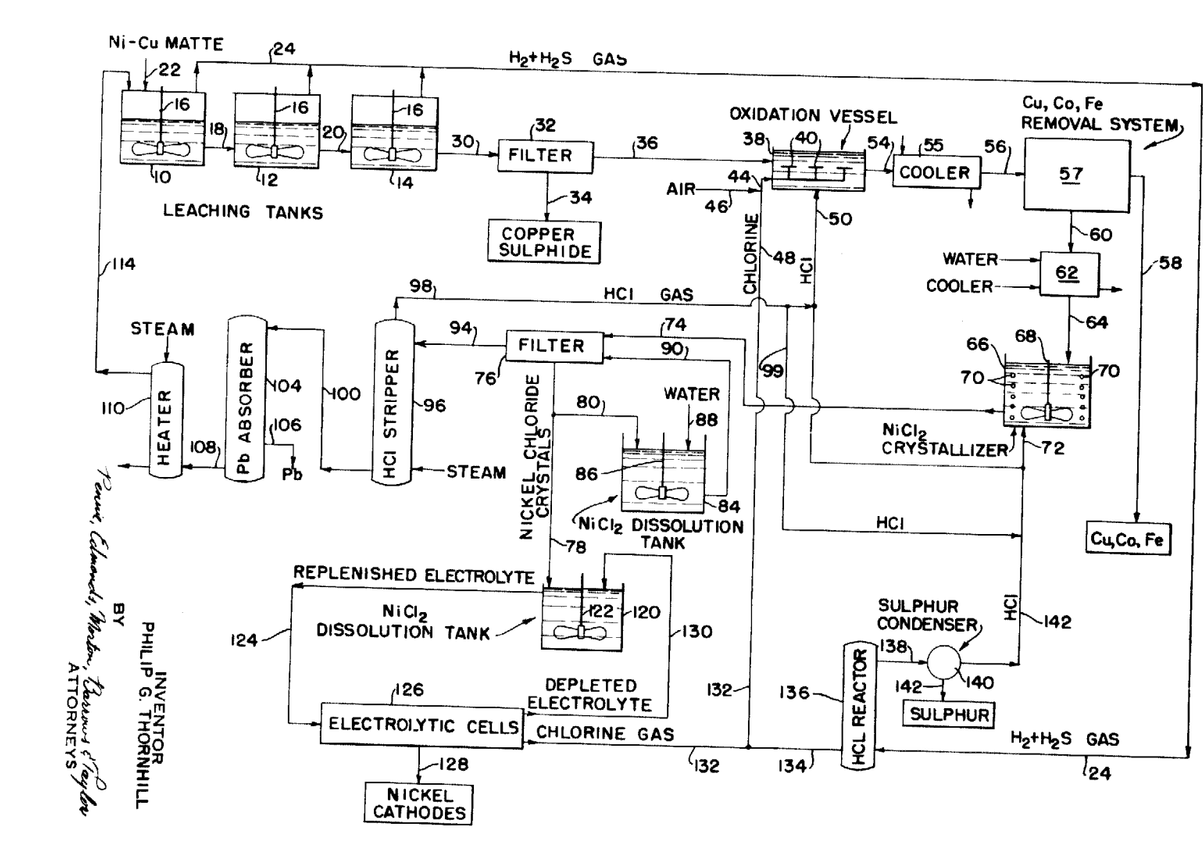

Referring to the upper left hand corner portion of the flow sheet, there is shown diagrammatically a leaching tank or tanks 10, 12, 14, provided with a suitable stirrer or agitating device 16, for the treatment of matte and the like. The tanks are interconnected with conduits 18 and 20 for transfer of the reaction mixture from tank 10 to tank 12 and from tank 12 to tank 14, respectively. An arrow 22 points to the tank and bears the legend "Ni-Cu Matte," showing that matte in a suitable form is to be introduced into the tank for leaching with hydrochloric acid, as indicated above, to dissolve as much as possible of the nickel and cobalt values of the matte. As a result of the leaching operation in the tanks some gases are evolved. They are hydrogen sulphide and hydrogen. A conduit 24 conducts the $H_2S$ and $H_2$ to an HCl reactor, to be described below.

A conduit 30 leads from below the liquid level of tank 14 to a filter 32. Here copper sulphide, $Cu_2S$, residue is separated from the filtrate; and an arrow 34 shows that the copper sulphide residue is taken to a copper department for further treatment.

A conduit 36 leads from the filter to an oxidation vessel, or vessels, 38, provided with spargers or other gas dispersing means 40. The vessel is shown with a feed conduit 44, a branch conduit 46 for the inlet of air, connected to a source not shown; optionally a branch conduit 48 for the inlet of chlorine, connected to a source to be described below; and a conduit 50 for the inlet of hydrochloric acid, connected to a source also described below. The conditioning agents (air or chlorine, or both, and HCl) are led into the vessel, preferably at its bottom, well below its normal liquid level, for treatment of the filtrate or pregnant solution. As will be pointed out below, the oxidation agents, air or chlorine, or both, function to remove residual hydrogen sulphide and to convert ferrous iron to ferric iron, while the hydrochloric acid helps to convert iron, cobalt and copper to their chloride anions.

A conduit 54 connects the conditioning vessel with a cooler 55 in case solvent extraction (to be described below) is employed for the separation of impurities. A conduit 56 connects the cooler with a copper, cobalt and iron removal vessel, or vessels, 57. As pointed out below this may be in the form of an anion exchanger or solvent extraction system. Here substantially all of the remaining Cu, Co and Fe chlorides are removed from the system. An arrow 58 indicates means for transferring the resulting Cu, Co and Fe to a department for the separation and recovery of those metals.

A conduit 60 connects the Cu, Co and Fe removal vessel with a solution cooler 62. A conduit 64 connects the cooler with a nickel chloride precipitating vessel, or crystallizer vessels, 66 advantageously provided with a stirrer or agitator 68 and cooling means such as cooling coil 70. Here the concentration of hydrochloric acid in the nickel rich solution is raised by the passage of HCl gas through a conduit 72, connected to a source or sources to be described below, until the greater part of the nickel chloride is precipitated as hydrated crystals.

Conduit 50 for the passage of HCl to conditioning vessel 38, referred to above, is connected advantageously as a branch to conduit 72, as shown in the flow sheet, for flexibility of operation.

A conduit 74 connects nickel chloride precipitating vessel 66 with a filter 76. Here the nickel chloride crystals are separated from the stripped solution. An arrow 78 indicates means for removing the nickel chloride crystals for further treatment, to be described below.

A conduit 80 connects filter 76 with nickel chloride dissolution tank 84, advantageously equipped with an agitator 86. An arrow 88 indicates a supply of water used for preparing the solution by dissolution of a portion of the nickel chloride crystals obtained from filter 76. A conduit 90 connects tank 84 with filter 76 for supplying saturated nickel chloride solution to the filter for the replacement washing of the nickel chloride crystals obtained in the filter. In this way the highly acidic filtrate occluded by the crystals on the filter is replaced by neutral saturated solution, providing a suitable feed for the nickel electrodeposition circuit described below.

A conduit 94 connects filter 76 with a distillation or stripper column 96, advantageously heated with steam for the distillation of a portion of the HCl contained in the filtrate. Conduit 98 connects the top of column 96 with conduit 50, previously described, for the transfer of HCl gas to vessel 38. A branch conduit 99 connects conduit 98 with conduit 72, also previously described, for the transfer of HCl gas to vessel 66.

A conduit 100 connects distillation column 96 with a lead removal vessel or vessels 104. This vessel may, if desired, take the form of an ion exchange column, to be described below. An arrow 106 indicates means for removing unwanted lead from the formerly pregnant solution, which is now in the form of hydrochloric acid, depleted in nickel.

A conduit 108 connects lead removal vessel 104 with a heater 110 which is advantageously heated with controllable amounts of steam. A conduit 114 connects heater 110 with leaching tank 10, so that the purified hydrochloric acid may be used to leach further amounts of matte.

The nickel in the nickel chloride leaving filter 76 is to be recovered as such. To this end transfer means 78 communicates with a nickel chloride dissolution tank 120. It is advantageously provided with a stirrer or agitator 122 to facilitate dissolution of the nickel chloride crystals. Here the precipitate or crystals of purified nickel chloride go into solution and form a so-called nickel chloride electrolyte. The tank is shown as a part of an electrodeposition circuit formed of a conduit 124 connecting the tank with one or more nickel electrolysis cells 126. Arrow 128 indicates means for the removal of nickel cathodes resulting from the electrolysis of the nickel chloride electrolyte. The electrolysis step is well-known and no claim is made to it per se.

A conduit 130 connects the electrolytic cell or cells with dissolution tank 120 so that nickel chloride electrolyte may be utilized to dissolve the nickel chloride crystals. As shown in the flow sheet this is a cyclic operation, because the resulting electrolyte enriched in nickel chloride is returned to the cells through conduit 124.

The electrolysis operation results in the formation or evolution of chlorine gas. If chlorine gas is to be used as an oxidizing agent in oxidation vessel 38, a conduit 132 connects electrolytic cells 126 with conduit 48, which in effect forms a branch for the passage of $Cl_2$.

Conduit 134 also connects conduit 132 with an HCl reactor 136. As noted above conduit 24 connects leaching tanks 10, 12, and 14 with this reactor, so that chlorine, hydrogen sulphide and hydrogen gases are fed simultaneously to the reactor. HCl gas and sulfur vapor are formed in the reactor, and are passed together through a conduit 138 to sulfur condenser 140; where sulphur is separated from the gas stream by condensation and removed from the circuit as indicated by arrow 142. The HCl gas passes through condenser 140 and is led by a conduit 142 to a connection with conduit 72 where it may join the stream of HCl gas used in oxidation vessel 38 and precipitation, or "salting out," vessel or crystallizer 66. In both vessels the HCl gas combines with water to form hydrochloric acid. As indicated above, in vessel 38 the acid functions to assist in the formation of complex chloride anions of the metals copper, cobalt and iron; while in vessel 66 the acid facilitates precipitation of the nickel chloride crystals.

The conduits, such as acid resistant pipes, are appropriately valved to control the amounts of solution and gas passed therethrough. And the various vessels are closed to prevent the escape of noxious and dangerous gases to the surrounding atmosphere.

The principle of the method is further illustrated by the following brief description, considered with reference to the flow sheet. Finely divided copper-nickel Bessemer matte is treated with relatively concentrated hydrochloric acid in a concurrently operated series of mechanically agitated leaching tanks 10, 12 and 14. Since transfer of reacting mixture is by gravity or by the pumping action of the agitators, the system can be kept completely closed off from the atmosphere from the time that the matte and acid enter the system to the time that the reacted slurry of residue and nickeliferous pregnant solution leaves the last vessel. Thus the liquid-solid separation in filter 32 need not be made until the solids are completely reacted and have ceased to emit $H_2S$ gas, so that full recovery of the gases can be obtained for HCl regeneration. Closed filtration of the slurry and washing the cake then leaves the solid copper sulphide product free of noxious or corrosive properties and ready for convenient handling for recovery of the copper and other insoluble by-products, such as precious metals.

The pregnant solution, still containing large proportions of hydrochloric acid as well as the acid-soluble impurities of the matte, such as iron, cobalt, lead, and small amounts of copper, is treated in vessel 38 with an oxidation agent to remove the residual hydrogen sulphide and to convert the iron to the ferric state If necessary, conditioning of the solution is then completed by the addition to it of hydrogen chloride in amounts sufficient to convert the iron, cobalt and copper to their respective forms of complex chloride anions. The anionic impurities are then removed in vessel 57 by bringing the solution into contact with insoluble materials having an affinity for the complex chloride anions and afterwards separating the solution from the insoluble material and its burden of impurities. The material used for absorbing the impurities can be a solid anion exchange resin, a liquid organo-phosphate, or a liquid organic solvent, so long as it is substantially insoluble in the solution, but the preferred materials are liquid organic solvents and liquid organo-phosphates. The affinity displayed by the various resins and organic solvents for Cu, Co and Fe appear to be due to anion exchange characteristics.

In case the material used for absorbing the impurities is an ion exchange resin, it is desirable that the solutions be at a temperature higher than room temperature, say at about 50° C., in order to improve the degree of extraction of the impurities. Such a relatively high temperature not only improves the efficacy of the ion exchange resin per se, but also permits the addition of greater quantities of HCl and hence a greater degree of conversion of the impurities to the anionic state without danger of premature precipitation of nickel chloride crystals, because of its favorable effect on the solubility of nickel chloride in the solution. Under these circumstances the solution remains hot through the completion of the purification step, and must be subsequently cooled before proceeding to the precipitation, or crystallization, step. However, if the insoluble purification material is a liquid organic solvent, it may be preferable to cool the solution ahead of the purification step, in order to decrease the fire hazard. In this case it is necessary to ensure that the quantity of HCl added in conditioner 38 is controlled to avoid crystallization of nickel chloride crystals from the solution before the purification step.

The strongly acid pregnant solution, now substantially free of impurities such as iron, cobalt and copper, is made even more strongly acid by the addition of further quantities of hydrogen chloride from reactor and/or distillation unit 136 whereby the greater part of the nickel in the solution is precipitated as nickel chloride. The nickel chloride crystals, after separation in filter 76 from the acid mother liquor, are dissolved in the electrolyte of a closed circuit nickel electrodeposition system 126 employing insoluble anodes provided with means for recovering the chlorine gas released therefrom. The chlorine gas is led to a hydrogen chloride synthesis burner 136 where it is permitted to react with the hydrogen and hydrogen sulphide generated in the leaching circuit to yield sulphur and hydrogen chloride gas. The sulphur is condensed and solidified for sale as a valuable by-product, and the hydrogen chloride gas is employed as the "salting out" or precipitation agent for the nickel chloride crystals in vessel 66. Additional amounts of hydrogen chloride gas, either for nickel chloride precipitation or for acid conditioning prior to the purification step, are obtained by distillation from the acid mother liquor in vessel 96. The mother liquor, now depleted in acid, is treated in vessel 104 with an insoluble material having an affinity for lead to remove this metal and thus prevent its accumulation in the leaching circuit. The treated mother liquor is then returned to the leaching tanks for treatment of fresh quantities of copper-nickel Bessemer matte.

The separation of the iron, cobalt and copper in vessel 57 from the pregnant solution is based upon the observation that these metals are capable of forming complex anions in acid chloride solutions, while nickel is not. Thus it is known, for example, that the anions $CoCl_3^-$ and $CoCl_4^=$ can be made to occur in solutions of cobalt chloride strongly acidified with hydrochloric acid. These negatively charged complexes can be absorbed by strongly basic anion exchange resins of the quaternary amine type and are retained on the resin so long as the strongly acid environment is maintained. Dilution of the system with water, however, presumably causes the cobalt complexes to revert to simple cobalt cations $Co^{++}$, and so results in the release of this metal from the resin. In the same way iron is more strongly absorbed, and copper less strongly absorbed than cobalt; but all appear to have a common dependence on acidity for conversion to their respective anionic complex states.

It has been reported that cobalt chloride undergoes maximum conversion to a negatively charged complex in solutions which have a hydrochloric acid strength of 9 normal, and that the cobalt consequently displays its greatest affinity for anion exchange resins at this acidity. To confirm this report, the following experiments were carried out. An ion exchange column 2.54 cm. diameter by 57.0 cm. long was set up containing 300 cc. of the chloride form of an ion exchange resin of the strongly basic quaternary amine type known commercially as IRA-400. Two identical sets of hydrochloric acid solutions were prepared ranging in strength from 2 N to 9 N in HCl. Cobalt chloride was added to each member of the first set of the solutions in amounts sufficient to give a concentration of 1.6 g.p.l. cobalt. The second set was reserved for pre-conditioning of the resin. 1950 cc. (i.e. 6.5 bed volumes) of a given cobalt bearing solution were passed through the column, preconditioned in each case by water elution for cobalt removal followed by displacement of the water with the HCl solution corresponding in acidity to that of the cobalt solution. The percent cobalt absorption for each test was calculated from the analysis of the 1950 cc. effluent collected from the bottom of the column in each case. A similar series of tests were done in which ferric chloride was substituted for cobalt chloride. The results are given in Table I.

*Table I*

Effect of Acidity on Co and Fe Absorption at 25° C.

| HCl Normality | Percent Co Absorption | Percent Fe Absorption |
|---|---|---|
| 2 | 4 | 7 |
| 4 | 4 | 42 |
| 6 | 26 | 85 |
| 7 | 44 | 90 |
| 8 | 63 | 96 |
| 9 | 88 | 100 |

The above figures show that the effectiveness of the cobalt absorption increases as an approximately linear function of the acid content of the solutions between 6 and 9 normal in HCl, while a similar trend in iron absorbability exists in a lower range of acidity. Thus, in order to take advantage of the maximum absorption efficiency in separating cobalt from acid nickel chloride solutions, it would appear necessary to ensure first that the nickeliferous solutions have a hydrochloric acid content at least approaching 9 normal, a condition which, at practical nickel concentrations, would result in the precipitation of solid nickel chloride crystals from the solution before separation of the impurities could be effected. However, during the course of the experiments on which the present invention is based, it was found that the nickeliferous solutions did not require the high degree of acidity supposed necessary for efficient cobalt separation. This is borne out by the data of Table II in which the results of a series of tests are reported. These tests were carried out under conditions identical in every respect to those reported in Table I, except that the solutions used contained nickel chloride in concentration equivalent to 80 grams nickel per litre.

*Table II*

EFFECT OF ACIDITY ON Co AND Fe ABSORPTION AT 80 G.P.L. NICKEL, TEMP. 25° C.

| HCl Normality | Percent Co Absorption | Percent Fe Absorption |
|---|---|---|
| 2 | 8 | 52 |
| 4 | 33 | 86 |
| 6 | 74 | 100 |
| 7 | 96 | 100 |
| 8 | ($NiCl_2$ ppte.) | ($NiCl_2$ ppte.) |
| 9 | ($NiCl_2$ ppte.) | ($NiCl_2$ ppte.) |

A comparison of the above data with those of Table I points up the surprising fact that the presence of relatively large concentrations of nickel in the solution actually renders the contained cobalt more separable from the solution than is the case in the absence of nickel. Thus, while the cobalt is only 44% absorbed from nickel-free solution having an acidity of 7 normal HCl, a 96% absorption is obtained under conditions which are exactly similar except for the presence in the solution of 80 grams per litre of nickel, a metal from which cobalt has heretofore been successfully separated only with great difficulty. This wholly unexpected result thus made possible the efficient separation of the cobalt from nickeliferous hydrochloric acid solutions containing nickel in practical concentrations, without the necessity of first neutralizing the valuable concentrations of free acid in the solution.

Cobalt adsorption in the ion exchange resin is enhanced not only by the presence of nickel in the solution, but also by increased temperature. Thus the absorption of cobalt was increased from the 74% shown in Table II for the 6 N HCl solution at 25° C. to 81% when identical solutions were subjected to the same procedure at 40° C. At 50° C. the percent absorption was even higher, amounting to 92% of the contained cobalt.

The unexpectedly beneficial effect of increased nickel concentration on the separability of cobalt from nickel was also found to apply when a liquid organic solvent was substituted for the anion exchange resin used in the above experiments. Thus when tri-iso-octyl amine, for example, dissolved in an organic carrier liquid such as xylene, was brought into contact with hydrochloric acid solutions containing small amounts of cobalt, and varying amounts of nickel, the degree of cobalt absorption in the organic phase which separated out was found to increase with increasing nickel concentration in the nickeliferous hydrochloric acid solution. This phenomenon is illustrated by the results of the following experiment in which nickeliferous hydrochloric acid solutions containing fixed amounts of HCl and cobalt, but varying amounts of nickel, were treated. The treatment comprised bringing the organic solvent into intimate contact with the nickeliferous hydrochloric acid, or aqueous, solution, then permitting the latter to settle out from the former by gravity. The organic solvent was a mixture of one volume of tri-iso-octylamine and four volumes of an inert carrier liquid consisting of aromatic hydrocarbons, and was used with an equal volume of aqueous solution in each of four successive extractions. The aqueous solutions were hydrochloric acid solutions running 4.34 normal in HCl and carrying 1.80 g.p.l. cobalt. The effect of nickel concentration on the cobalt extraction is illustrated by the data in Table III.

*Table III*

EFFECT OF NICKEL CONCENTRATION ON SOLVENT EXTRACTION OF COBALT FROM NICKELIFEROUS HYDROCHLORIC ACID SOLUTIONS

| Ni, g.p.l. | Cobalt gm./litre | | Organic | | |
|---|---|---|---|---|---|
| | Before Extr. | After Extr. | Co, g.p.l. | Ni, g.p.l. | Co, percent Extr. |
| 25 | 1.80 | 0.83 | 3.88 | 0.21 | 54.0 |
| 50 | 1.80 | 0.52 | 5.12 | 0.53 | 71.1 |
| 75 | 1.80 | 0.29 | 6.05 | 0.37 | 84.0 |
| 100 | 1.80 | 0.14 | 6.65 | 0.59 | 92.4 |

The above data point up the marked selectivity displayed by the organic absorbent for cobalt over nickel in the hydrochloric acid solution, and the increasing selectivity obtained with increased nickel concentration.

A specific example of the operation of the present invention is as follows: Copper-nickel Bessemer matte was comminuted to the extent that 95% could be passed through a 325 mesh screen, and was found to have the following chemical analysis expressed as percent by weight:

*Table IV*

ANALYSIS OF COPPER-NICKEL BESSEMER MATTE

| Cu | Ni | S | Fe | Co | Pb | As |
|---|---|---|---|---|---|---|
| 26.45 | 48.18 | 20.55 | 1.18 | 0.78 | 0.035 | 0.11 |

Desorbed mother liquor running about 27 g.p.l. nickel as choride and about 7.6 N in HCl and also carrying traces of copper, iron and cobalt was fed concurrently and continuously with the matte into a series of four mechanically agitated reaction vessels in cascade. The relationship between feed rates and reaction volume was such that the reaction mixture had an average retention time in the four vessel cascade of about 11 hours. The temperature of the reaction was controlled to 65° C., and all gases emitted by the reacting mixture were led away from the system by induction. The reacted mixture was continuously withdrawn from the fourth vessel and filtered to give a copper sulphide residue analyzing about 77% copper and 1.3% nickel, and a pregnant solution analyzing about 92 g.p.l. nickel, .36 g.p.l. copper and about 5.2 normal in HCl. That is to say, over 99% of the nickel originally in the matte was extracted by the solution, and over 99% of the copper was retained by the copper sulphide residue.

The pregnant solution was cooled to room temperature and treated by bubbling $H_2S$ gas through it for the precipitation of part of the contained copper, and after filtration of the product, the copper concentration of the solution was found to be 0.15 g.p.l. Chlorine gas was then added to the solution for oxidation of the contained iron to the ferric state, and a further treatment with air served to remove excess chlorine.

While the ferrous iron in the solution was oxidized with chlorine, it was also found that the ferrous chloride can be oxidized to ferric chloride rapidly and conveniently by passing finely dispersed air through a column containing the solution. The air can be dispersed by a porous sparger, or, more advantageously, by a glass venturi and solution pump. In either case, the effectiveness of the air in oxidizing these particular solutions appears to be due in large part to their density, surface tension and viscosity, all of which provide conditions extremely favorable for bubble dispersion and retention.

Following the oxidation treatment, hydrogen chloride gas was added to the solution to increase its acidity to about 6.5 normal in HCl, and so to increase the degree of conversion of iron, cobalt and copper to their respective anionic chloride complexes. The acidified solution was then passed through two 22″ columns in series containing an ion exchange resin of the strongly basic quaternary amine type at a superficial space rate of about 10 cm./minute for removal of the iron, cobalt and copper.

The purified solution discharge from the second column was collected and fed continuously and concurrently with hydrogen chloride gas into a mechanically agitated reaction vessel operating at about 10° C. for precipitation of the nickel chloride. The relationship existing between the feed rates of the solution and HCl gas and the volume of the vessel were such that the reactions took place over an average retention time of about 11 hours, although succeeding experiments showed that the operation could be successfully carried out at retention times as low as four hours and at temperatures as high as 25° C. The resulting slurry of nickel chloride crystals and solution was continuously withdrawn at such a rate as to maintain constant reaction volume, and the crystals were separated from the solution by filtration.

A replacement wash on the filter with a saturated aqueous solution of nickel chloride effectively separated the occluded mother liquor from the nickel chloride crystal precipitate, and resulted in an overall filtrate containing about 27 g.p.l. nickel and running about 9.3 normal in HCl. This filtrate was passed through a desorber apparatus in which part of the HCl content was transferred to a flow of oxidized pregnant solution as noted above. Thus the HCl content of the mother liquor filtrate was reduced from 9.3 to about 7.6 normal in HCl, the desired acidity for feed to the leaching circuit.

However, in order to prevent the accumulation of lead in the leaching circuit, the solution was first passed through an ion exchange column containing a weakly basic anion exchange resin of the polyamine type in its chloride form. This treatment was found to prevent the lead from reaching a concentration higher than about 0.15 g.p.l. in the leach circuit solution, even though pick-up of this metal amounted to about 0.5 gram into each litre of solution fed to the leaching system.

Table V summarizes the chemical analyses of some leaching circuit solutions as they passed through the above described process leading to the production of the pure nickel chloride. Analyses are in grams per litre.

Table V
ANALYSES OF LEACHING CIRCUIT SOLUTIONS

| Solution | HCl Normality | Cu | Ni | Fe | Co | Pb |
|---|---|---|---|---|---|---|
| Leach Acid | 7.6 | .01 | 26.3 | .02 | .01 | .08 |
| Pregnant Solution | 5.1 | .19 | 91.7 | 1.59 | 1.02 | .13 |
| Conditioned Solution | 6.3 | .15 | 87.6 | 1.56 | .58 | .11 |
| Purified Solution | 6.2 | .04 | 87.4 | .01 | .01 | .12 |
| Mother Liquor | 9.5 | .04 | 20.1 | .02 | .01 | .12 |

The nickel chloride crystals obtained as the primary product of the procedure described above were found to exist in the form of the quadrihydrate, $NiCl_2 \cdot 4H_2O$. On reduction with hydrogen in a tube furnace held at about 700° C., the chloride yielded a nickel metal sponge which on spectrographic analysis was found to contain the impurities expressed as weight percent in Table VI.

Table VI
SPECTROGRAPHIC ANALYSIS OF NICKEL REDUCED FROM $NiCl_2 \cdot 4H_2O$

| Cu | Fe | Co | Pb | Ca | Al | Mg | Na | Si | Mn |
|---|---|---|---|---|---|---|---|---|---|
| .008 | .002 | .009 | .0008 | .003 | .0005 | .001 | .003 | .001 | .002 |

The extreme state of purity of the nickel chloride is indicated by the above analysis of the nickel reduced from it. Thus the chloride is ideally suited to use as a source of nickel for replenishment of the electrolyte in an electro-winning circuit, since the electrolyte itself would require little, if any, purification beyond dechlorination and graphite removal.

A cobalt content of .009% is considerably lower than that in even the best of the nickel cathodes now produced in the industry. By giving the leach solution a second pass through the ion exchange column, the cobalt in the solution is reduced to the extent that the resulting nickel chloride yields a nickel metal containing cobalt as low as .0003%.

Further experimental data are of interest. By increasing the rate at which matte was fed to the leaching system, again at a treatment temperature of about 65° C., the strength of the leach solution was increased from the 91.7 g.p.l. noted in Table V, to between 115 and 121 g.p.l. nickel, as shown in Table VII below.

Table VII
MATTE LEACH DATA

| Product | Assays, percent or g.p.l. | | | | | | Extraction, | |
|---|---|---|---|---|---|---|---|---|
| | N-HCl | Cu | Ni | Fe | Co | Pb | Cu | Ni |
| Matte | | 26.30 | 48.28 | 1.30 | 0.68 | 0.04 | | |
| Feed acid | 8.02 | | 25.92 | | | 0.06 | | |
| Solution | 4.45 | 0.82 | 121.50 | 2.36 | 1.75 | 0.12 | 1.4 | 98.71 |
| Residue | | 76.30 | 1.81 | | | 0.008 | | |

The efficacy of the copper-nickel separation achieved in the leaching step in Table V is indicated by the materials balance given in Table VIII.

Table VIII
MATTE LEACH MATERIALS BALANCE

| Product | Amount | Analysis, percent or g./l. | | Distribution, percent | |
|---|---|---|---|---|---|
| | | Cu | Ni | Cu | Ni |
| Matte | 100 kg. | 26.12 | 48.30 | 100 | 100 |
| Ni Pregnant Solution | 740 lt. | 0.36 | 91.70 | 1.0 | 99.6 |
| Ni Leach Residue | 33.4 kg. | 77.30 | 0.63 | 99.0 | 0.4 |

The nickel leach residue, which is the secondary product of the process, is a mixture of the sulphides CuS and $Cu_2S$, containing virtually all of the gold and platinum group metals and selenium occurring in the original copper-nickel matte. This sulphide mixture, on roasting at 800° C., yielded a calcine from which over 99% of the copper could be leached with $N/2$ $H_2SO_4$ to give a copper sulphate solution containing about 57 grams copper per litre. The resulting copper leach residue, containing all of the gold and platinum metals, amounted to 0.97% of the weight of the original matte. This represented a concentration of over 100 to 1, i.e. a concentration more than five times as great as that obtained in conventional anode slimes. But an even more important advantage will be obvious to those skilled in the art: this is the fact that the copper leach residue and its content of platinum metals and gold is obtained by filtration of a copper leach solution, and is thus recovered all in one place by a simple filtration operation. Contrasted against this simple technique is the troublesome method of recovering anode slimes by manual scraping of partly corroded anodes and cleaning of emptied electrodeposition tanks, in addition to separation by filtration of relatively large volumes of electrolyte.

Returning now to the nickel leaching circuit, an examination of the data presented in Table V reveals that the pick-up of nickel by the leach solution amounts to over 60 grams per litre. Thus when 1 litre of this solution undergoes purification, the impurities are separated from over 60 grams of new nickel entering the circuit. But in the conventional electrolytic process involving the corrosion of impure nickel anodes, the pick-up of nickel by the anolyte is only of the order of 10 grams per litre. This means that 6 litres of anolyte must be purified in order to separate the impurities from the equivalent 60 grams. In other words, the volume of solution requiring purification in the present process is less than one-sixth as great as that required in the conventional case. Furthermore, the amounts of the impurities entering the nickel pregnant solution described in Table V are considerably less than those entering the conventional anolyte, chiefly because of the virtual absence of copper and arsenic in the former.

A similar examination of the data presented in Table VII reveals that the pick-up of nickel by the solution amounts to about 95 grams per litre. Thus when 1 litre of this solution undergoes purification, the impurities are separated from about 95 grams of new nickel entering the circuit, comparing even more favorably with the 10 grams entering the conventional electrolyte.

However, an even more important advantage of the present process over conventional electro-refining is due not so much to the smaller concentrations of impurities in smaller volumes of solutions, but to the greatly increased economy and efficiency which can be realized in the practice of the purification method itself. Thus in the present process adequate purity of pregnant solution is achieved simply by passage of the solution through ion exchange columns or a solvent extraction system or a combination of both operations. In contrast, the necessary degree of purification of conventional anolyte is effected only after such relatively painstaking operations as neutralization, cementation and precipitation, each such operation being followed by the labor consuming filtration and washing of its respective precipitate from the solution. Moreover, the precipitation and cementation steps consume expensive reagents, whereas the ion exchange resin and/or organic solvents used in the present process are not consumed but can be regenerated by means of a simple water wash.

A typical metal balance resulting from four cycles of the ion exchange purification step is given in Table IX. In this operation the oxidized solution, having an acid normality of 6.3, was passed through two 22" x 2" diameter columns in series, each such column charged with the anion exchange resin known commercially as IRA–400. Solutions were held at a temperature of 25° C. and were passed through the resin beds at a superficial linear space rate of 10 cm./minute. Loading of the resin was followed by replacement of the occluded solution by 10 normal HCl; the acid was in turn replaced by a water wash which also served to free the resin of its absorbed load of copper, iron and cobalt. The occluded water was then displaced from the resin by passage of the required volume of purified solution, thus completing the regeneration of the columns.

Table IX

ION EXCHANGE PURIFICATION OF CONDITIONED PREGNANT SOLUTION

| Product | Volume, litres | Analysis, g.p.l. | | | | Distribution, percent | | | |
|---|---|---|---|---|---|---|---|---|---|
| | | Cu | Ni | Fe | Co | Cu | Ni | Fe | Co |
| Conditioned Solution | 40.0 | 0.14 | 89.8 | 1.70 | 0.93 | 100 | 100.0 | 100 | 100 |
| Purified Solution | 42.9 | 0.03 | 84.5 | 0.01 | 0.01 | 21 | 99.7 | 1 | 1 |
| Cobalt Solution | 2.5 | 1.05 | 3.7 | 22.10 | 13.40 | 47 | 0.3 | 81 | 88 |
| Wash Solution | 2.2 | 0.75 | tr. | 5.00 | 1.80 | 32 |  | 18 | 11 |

The cobalt solution resulting from the elution of the resin columns had an acid content of about 4.5 normal in HCl, and it was found that its iron content was easily extractable by bringing the solution into contact with a solvent consisting of a mixture of tri-butyl-phosphate and kerosene, which is insoluble in the cobalt solution. This mixture, like the ion exchange resin, could then be regenerated for re-use by water washing, and the iron could be discarded as an aqueous solution of ferric chloride, without loss of solvent. The data reported in Table X show the selectivity which this solvent exhibits for iron in the cobalt solution.

Table X

SOLVENT EXTRACTION OF IRON FROM TYPICAL COBALT SOLUTION

| Product | Volume, litres | HCl Norm. | Analysis, g.p.l. | | | Percent Distribution | |
|---|---|---|---|---|---|---|---|
| | | | Cu | Ni | Fe | Cu | Fe |
| Cobalt Solution | 1.00 | 4.1 | 1.68 | 3.84 | 22.2 | 10.64 | 100.0 |
| Fe-free Cobalt Solution | .94 | 3.6 | 1.65 | 3.75 | 0.1 | 10.80 | .4 |
| Wash Solution | 1.00 |  | 0.03 | 0.14 | 21.3 | 0.26 | 99.6 |

The iron-free cobalt solution was acidified and passed through the ion exchange columns for re-absorption of the cobalt. Acid washing and water elution of the loaded resin then resulted in substantially complete recovery of the cobalt in a solution analyzing over 40 g.p.l. cobalt, and less than 0.5 g.p.l. nickel. The nickel-bearing washings were re-cycled to the leaching circuit, and the cobalt was found to be easily recoverable from its solution by known methods.

As has been stated earlier, the purified nickel pregnant solution was treated with HCl in a continuously operating reaction vessel for the precipitation of the pure nickel chloride crystals. The temperature in the above example was held at about 10° C., and the crystals were found to form as $NiCl_2 \cdot 4H_2O$. Thus, as water of crystallization alone, 72 grams of water separated from the solution with each gram mol of nickel precipitated. This diversion of water from the leaching and purification system was found to be beneficial in that it substantially made up for the dilution incidental to the washing of the $Cu_2S$ filter cake and regeneration of the ion exchange resin columns.

Moreover, when the nickel chloride is used as feed for restoring the strength of a closed electro-winning circuit, the four mols of water entering with each mol of nickel chloride are found to compensate closely for the water lost by evaporation from the electrodeposition tanks. Thus the present invention not only provides for the maintenance of volumetric balance in the leaching circuit by the withdrawal therefrom of water of crystallization, but also provides for a necessary supply of what is essentially distilled water to maintain the volumetric balance in an electrodeposition circuit. In other words, the process possesses all of the advantages inherent in a system comprising two isolated circuits, but still permits of the transfer of water from the firsrt circuit to the second, without the impurities and acid which would accompany the water if it were transferred as solution.

It can be seen by comparison of the purified solution analysis in Table V with the nickel analysis in Table VI that while the lead in the former occurs in the proportion of about 1400 parts per million of nickel, that accompanying the nickel product occurs in the proportion of only 8 parts per million. That is to say, the precipitation of over 75% of the nickel chloride contained in the purified solution was accompanied by the precipitation of less than 0.6% of the contained lead. The high degree of selectivity practically excludes all but trace quantities of the lead from the nickel chloride resulting from the precipitation step, and thus permits the production of nickel having an extremely low lead content. Considerable selectivity is also obtained against other residual impurities occurring in the purified solution, so that instead of contaminating the nickel product, they remain for the most part with the mother liquor, with which they are returned to the leaching circuit for the production of fresh pregnant solution. Passage of the pregnant solution through the anion exchange resins again restores the solution to the level of purity required for the precipitation of nickel chloride crystals, and the accumulation of impurities in the circulating solution is thereby prevented.

The practice of the present invention is not restricted to the use of ion exchange resins for the separation of the impurities from the strongly acid pregnant solution. Copper, for example, can be separated from the cold, strongly acid, nickel chloride pregnant solutions by treatment with hydrogen sulphide gas, whereby it is precipitated as an insoluble sulphide separable from the solution by filtration. Ferric iron can be selectively absorbed in tri-butyl-phosphate diluted with a water insoluble organic carrier liquid, such as kerosene, or a high flash point aromatic solvent, or it may be absorbed by various other organic solvents, such as ternary amine compounds, ketones, such as methyl isobutyl ketone, and ethers. Subsequent absorption of the cobalt and copper from the resulting iron-free solution can be carried out on strongly basic anion exchange resin with considerably greater efficiency, since the entire capacity of the resin can be utilized for recovery of these metals. An alternative method of separating the copper and cobalt from the iron-free nickel leach solution is to contact it with a mixture of tri-iso-octyl amine and an organic carrier, such as kerosene, or xylene or other aromatic solvent. Cobalt chloride is also separable from the iron-free solution by contact with higher alcohols such as capryl alcohol, while the nickel chloride is not absorbed by this compound.

The impurities may be absorbed from the pregnant solution either together or separately. For example, an alternative method of effecting the iron-cobalt separation is to bring the tri-butyl-phosphate-organic carrier, such as kerosene mixture into contact with oxidized nickel pregnant solution. This procedure removes the iron from the solution but does not affect the cobalt. The cobalt can then be either absorbed on the anion exchange resin as described earlier, or absorbed by capryl alcohol or other suitable solvent and subsequently separated therefrom in a form free from both iron and nickel. A third possible method of selective cobalt removal is to conduct the ion exchange absorption from the nickel pregnant solution in the acidified, but unoxidized state. The contained iron, being in the ferrous form, does not form the negatively charged complex, and consequently passes through the resin bed with the nickel. Subsequent oxidation of the iron in the resulting cobalt-free solution then paves the way for separation of iron either by passage through a second iron exchange column or by tri-butyl-phosphate solvent extraction.

An example of the application of the all solvent extraction method of solution purification to nickel pregnant solutions described earlier is as follows. About 9.6 litres of the oxidized impure nickel-hydrochloric acid leach solution was brought into intimate contact with about 1.9 litres of a 20% by volume mixture of tri-butyl phosphate in an organic carrier liquid known commercially as Solvesso 150, consisting of aromatic solvents having a flash point of about 150° C. (The purpose of the latter was merely to reduce the viscosity and specific gravity of the organic phase, and thus to facilitate its separation from the nickel solution.) Contact between the nickel solution and the organic solvent was effected by mechanical agitation for about 2 minutes at room temperature, after which period the mixture was allowed to remain quiescent for 2 minutes to permit the separation by gravity of the heavy iron-free nickel solution from the lighter tri-butyl-phosphate solvent mixture. Chemical analysis of the separated phases gave the data included in Table XI.

Table XI

REMOVAL OF IRON FROM NICKEL SOLUTION WITH TRI-BUTYL PHOSPHATE

| Product | Volume, litres | HCl Normality | Analyses, g.p.l. | | | |
|---|---|---|---|---|---|---|
| | | | Ni | Fe | Co | Cu |
| Oxidized Nickel Solution | 9.6 | 4.57 | 106.8 | 2.13 | 1.57 | 0.80 |
| Iron-free Solution | 9.6 | 4.50 | 106.8 | trace | 1.57 | 0.80 |
| Tri-butyl phosphate Mixture | 1.9 | 0.36 | trace | 10.75 | trace | trace |

The iron picked up by the tri-butyl phosphate solvent mixture was washed free with water, restoring the capacity of the solvent for further quantities of iron.

Iron-free nickel solution obtained by the above method was then subjected to a second solvent extraction treatment for removal of the contained copper and cobalt. The organic solvent used in this case was a 20% by volume mixture of tri-iso-octyl amine in an organic carrier liquid known commercially as Solvesso 100, consisting of aromatic solvents having a flash point of about 100° C., the latter again serving only to reduce the viscosity and specific gravity of the organic phase. One litre of the organic solvent was brought into intimate contact with the same volume of the iron-free solution by mechanical stirring for a period of 2 minutes, after which the nickel solution was permitted to settle free from the organic phase for a further 2 minute period. The separated organic solvent was then brought into contact with a second litre of fresh nickel solution, and again separated therefrom. A second repetition of the operation with a third litre of fresh solution resulted finally in 1 litre of loaded organic solvent, and three treated lots of nickel chloride solution were combined to give a common product designated as purified solution. The efficiency of the cobalt separation, in particular, can be seen from the results of the separation given in Table XII.

Table XII

REMOVAL OF COBALT AND COPPER FROM ACID NICKEL CHLORIDE SOLUTIONS WITH TRI-ISO-OCTYL AMINE

| Product | Volume, litres | HCl Normality | Analyses, g.p.l. | | | |
|---|---|---|---|---|---|---|
| | | | Ni | Fe | Co | Cu |
| Iron-free Solution | 2.9 | 4.40 | 102.8 | trace | 1.76 | 0.83 |
| Purified Solution | 2.9 | 4.36 | 102.7 | trace | trace | 0.02 |
| Tri-iso-octyl Amine Solution | 1.0 | 0.9 | .13 | trace | 5.10 | 2.35 |

The loaded tri-iso-octyl amine organic solution was washed free of cobalt and copper with water. This restored the capacity of the solvent for these metals on the one hand, and yielded on the other hand a solution containing them, from which they could be recovered by known methods.

The precipitated nickel chloride crystals, which are the product of the process, can either be reduced to metal by furnace treatment with hydrogen gas, whereby hydrogen chloride is directly regenerated for re-use in the process, or they can be dissolved in the solutions of a nickel chloride electro-winning circuit and reduced to metal in the form of cathodes. The chlorine liberated at the insoluble anodes can then be collected and fed with the hydrogen and hydrogen sulphide gas evolved by the matte leaching reactions to a hydrochloric acid burner where the gases are mixed and reacted at flame temperature. The product gas, consisting of a mixture of hydrogen chloride and gaseous sulphur, can then be passed through a condenser for separation of the sulphur as a by-product, and the resulting hydrogen chloride is re-cycled to the process as described earlier.

The series of experiments on which this invention is based included the operation of a hydrochloric acid burner designed for the combustion of a mixture of hydrogen and hydrogen sulphide with chlorine. The burner was installed at the bottom of a vertical combustion chamber and was connected to metered supplies of hydrogen, hydrogen sulphide and chlorine. The top of the combustion chamber was fitted with a gas outlet leading to a sulphur condenser and trap maintained at about 125° C. to prevent solidification of the sulphur. The sulphur condenser discharged to a hydrochloric acid absorption tower, likewise equipped with a trap, for recovery of the acid produced.

The initiation of the reaction between the gases was preceded by a heating-up period in which hydrogen was burned in air. Gradual substitution of chlorine for air as the combustion medium was then followed by a partial substitution of hydrogen sulphide for hydrogen, to give the desired proportion of the latter two gases. On achievement of adequate temperature in the system, the reaction was found to proceed substantially to completion in accordance with the following equation:

$$xH_2 + yH_2S + (x+y)Cl_2 \rightarrow 2(x+y)HCl + \tfrac{1}{2}yS_2$$

With a slight excess of clorine in the reacting mixture, sulphur chlorides were found in the products; a deficiency of chlorine resulted in the presence of hydrogen sulphide with the hydrogen chloride produced. But provided the volumetric ratio $H_2 + H_2S : Cl_2$ was closely controlled to equal unity, the amounts of these contaminants were negligible. This was found to be true through the range of $H_2 : H_2S$ ratios studied, viz. from 1.5:1 to 1.1:1.

It is important that the reaction be made to take place in a burner or other flame-producing device, since it is only at temperatures reached by a flame that undesirable side reactions involving the formation of sulphur chlorides can be prevented. It is also important that the walls of the combustion chamber and product gas ducts be maintained at temperatures of 400° C. or more to prevent sulphur build-up before it reaches the condenser.

These experiments demonstrated the practicability of hydrogen chloride regeneration by reaction of the leach gases with chlorine evolved from the nickel electrowinning cells, and thus showed that the nickel refining process described is practically self-sustaining with respect to chemical reagents. They also showed that the sulphur originally associated with the nickel can be incidentally recovered as a valuable by-product. This element is produced in a state of extreme purity, since its formation does not take place in the presence of solid contaminants or selenium compounds. The sulphur therefore possesses considerable advantage in ready marketability.

The procedures outlined in this specification have been described to serve as examples only, and are not intended to provide limitations beyond those given in the appended claims. Thus the practice of the present invention is applicable not only to copper-nickel Bessemer matte of the type herein described, but to any nickeliferous material from which it is desired to obtain the nickel in a pure form. Similarly, it is not meant that the examples of methods of solution purification should serve to define limits but merely that they illustrate applications of the principles involved.

I claim:

1. In the method of recovering high purity nickel chloride by hydrochloric acid leaching of finely divided nickel-copper matte containing acid-soluble impurities such as iron and cobalt, the improvement which comprises establishing a mixture of the matte in a stoichiometric excess of hydrochloric acid to form a reacting slurry evolving hydrogen sulphide, feeding matte and a stoichiometric excess of hydrochloric acid to the mixture, maintaining the mixture as an agitated suspension to convert the nickel and acid soluble impurities to their dissolved chlorides but to maintain the copper as insoluble copper sulphide residue, maintaining the matte in contact with the excess acid until the nickel is substantially completely reacted to form nickel chloride, withdrawing reacted slurry from the suspension substantially as fast as matte and acid are fed to the suspension, separating the insoluble residue from the resulting nickeliferous acid in the reacted slurry, subjecting the nickeliferous acid to the action of an oxidizing agent selected from the group oxygen and chlorine to remove residual hydrogen sulphide and to convert ferrous iron to ferric iron, maintaining the nickeliferous acid sufficiently strong to convert the ferric iron as well as the cobalt to their chloride anion complexes, bringing the nickeliferous acid into contact with organic material insoluble in the acid but capable of absorbing metal chloride anion complexes, adding hydrogen chloride to the nickeliferous acid to promote selective crystallization of nickel chloride, crystallizing nickel chloride to form high purity nickel chloride crystals and barren acid contaning residual acid soluble impurities, separating the crystallized nickel chloride from the barren acid, distilling hydrogen chloride from the barren acid thereby adjusting its acid concentration substantially to its original strength, using the hydrogen chloride to promote the selective crystallization of nickel chloride by addition to further quantities of nickeliferous acid, and using the adjusted barren acid to treat further amounts of the finely divided matte thus maintaining a leaching circuit.

2. Method according to claim 1, in which the hydrogen sulphide gas is mixed with chlorine gas in a reacting flame gaseous hydrogen chloride and sulphur vapor; the hydrogen chloride is used to promote the selective crystallization of nickel chloride; and the sulphur vapor is condensed to form elemental sulphur.

3. Method according to claim 1, in which the nickeliferous acid is treated with hydrogen chloride to increase its acidity and enhance the conversion of copper, cobalt and iron to their chloride anion complexes to facilitate their separation from the acid.

4. Method according to claim 1, in which the ferric chloride iron anion complex is first removed by bringing the nickeliferous acid in contact with an organophosphate; and the resulting iron-free nickeliferous acid is then brought in contact with a ternary amine to effect the removal of the cobalt and copper chloride anion complexes.

5. Method according to claim 1, in which the nickel chloride crystals are formed and separated as the quadrihydrate $NiCl_2 \cdot 4H_2O$, thereby removing about 4 mols of water per mol of nickel chloride crystallized from the nickeliferous acid.

6. Method according to claim 1, in which the nickel chloride crystals are formed as the quadrihydrate $NiCl_2 \cdot 4H_2O$; the crystals are separated from the barren acid by filtration; and the separated crystals are subjected to displacement washing on the filter by a substantially saturated aqueous solution of high purity nickel chloride for the removal of residual barren acid.

7. Method according to claim 1, in which the separated nickel chloride crystals are dissolved in a nickel chloride electrolyte otherwise isolated from the leaching circuit; the nickel chloride electrolyte is subjected to electrolysis to form chlorine gas and nickel metal uncontaminated by impurities dissolved in the leaching circuit; the chlorine is converted to hydrogen chloride; and the hydrogen chloride is returned to the leaching circuit.

8. Method according to claim 1, in which the nickel chloride crystals are formed as the quadrihydrate $NiCl_2 \cdot 4H_2O$; the separated crystals are washed by a substantially saturated aqueous solution of high purity nickel chloride for the removal of residual barren acid; the washed nickel chloride crystals are reduced with hydrogen at an elevated temperature to form metallic nickel and hydrogen chloride; and the hydrogen chloride is returned to the leaching circuit.

9. Method according to claim 1, in which the acid soluble impurities include lead; the lead is retained in the barren acid after crystallization of the nickel chloride; and the adjusted barren acid is treated to remove lead.

10. Method according to claim 9, in which the lead is removed by bringing the adjusted barren acid into contact with a weakly basic anion exchange resin of the polyamine type.

References Cited in the file of this patent

UNITED STATES PATENTS

| | | |
|---|---|---|
| 1,067,698 | Wells | July 15, 1913 |
| 1,577,422 | Hybinette | Mar. 16, 1926 |
| 2,642,356 | Beidler | June 16, 1953 |
| 2,766,115 | Graham et al. | Oct. 9, 1956 |
| 2,848,322 | Conn et al. | Aug. 19, 1958 |
| 2,873,170 | Hyde et al. | Feb. 10, 1959 |

FOREIGN PATENTS

| | | |
|---|---|---|
| 667,659 | Great Britain | Mar. 5, 1952 |

OTHER REFERENCES

Mellor: "Comprehensive Treatise on Inorganic Chemistry," page 407, vol. 15, Longmans Green & Co.
West: Laboratory Methods, July 1956, pages 49 and 50.
Electroplating Engineering Handbook (Graham), Reinhold Publishing Corporation, 1955, page 291.

UNITED STATES PATENT OFFICE
CERTIFICATE OF CORRECTION

Patent No. 3,085,054

April 9, 1963

Philip G. Thornhill

It is hereby certified that error appears in the above numbered patent requiring correction and that the said Letters Patent should read as corrected below.

Column 1, line 59, for "ssytem" read -- system --; column 5, line 44, for "$CoCl_3^-$" read -- $CoCl_3^=$ --; column 6, line 74, for "adsorption" read -- absorption --; column 7, line 27, for "tri-iso-octylamine" read -- tri-iso-octyl amine --; column 9, Table VII, for "Extraction," read -- Extraction-% --; column 12, line 25, for "firsrt" read -- first --; column 14, lines 62 and 63, the equation should appear as shown below instead of as in the patent:

column 15, line 60, for "contaning" read -- containing --; line 72, after "flame" insert -- to form --.

Signed and sealed this 12th day of November 1963.

(SEAL)
Attest:

ERNEST W. SWIDER
Attesting Officer

EDWIN L. REYNOLDS
Acting Commissioner of Patents

UNITED STATES PATENT OFFICE
CERTIFICATE OF CORRECTION

Patent No. 3,085,054                      April 9, 1963

Philip G. Thornhill

It is hereby certified that error appears in the above numbered patent requiring correction and that the said Letters Patent should read as corrected below.

Column 1, line 59, for "ssytem" read -- system --; column 5, line 44, for "$CoCl_3^-$" read -- $CoCl_3^=$ --; column 6, line 74, for "adsorption" read -- absorption --; column 7, line 27, for "tri-iso-octylamine" read -- tri-iso-octyl amine --; column 9, Table VII, for "Extraction," read -- Extraction-% --; column 12, line 25, for "firsrt" read -- first --; column 14, lines 62 and 63, the equation should appear as shown below instead of as in the patent:

$$xH_2 + yH_2S + (x+y)Cl_2 \longrightarrow 2(x+y)HCl + \tfrac{1}{2}yS_2$$

column 15, line 60, for "contaning" read -- containing --; line 72, after "flame" insert -- to form --.

Signed and sealed this 12th day of November 1963.

(SEAL)
Attest:

ERNEST W. SWIDER                  EDWIN L. REYNOLDS
Attesting Officer               Acting Commissioner of Patents